CIRCUIT FOR ADDING BINARY NUMBERS

Filed Dec. 12, 1949 4 Sheets-Sheet 1

F. C. Williams
A. A. Robinson
T. Kilburn
*Inventors*
*By* [signature]
*Attorneys*

June 30, 1953 F. C. WILLIAMS ET AL 2,643,820

CIRCUIT FOR ADDING BINARY NUMBERS

Filed Dec. 12, 1949 4 Sheets-Sheet 2

F. C. Williams
A. A. Robinson
T. Kilburn

*Inventors*

By Moore & Hall

*Attorneys*

F. C. Williams
A. A. Robinson
T. Kilburn
*Inventors*
By
*Attorneys*

F. S. Williams
A. A. Robinson
T. Kilburn

*Inventors*

By [signature]

*Attorneys*

Patented June 30, 1953 2,643,820

UNITED STATES PATENT OFFICE

2,643,820

CIRCUIT FOR ADDING BINARY NUMBERS

Frederic C. Williams, Timperley, Arthur A. Robinson, Scunthorpe, and Tom Kilburn, Davyhulme, Manchester, England, assignors to National Research Development Corporation, London, England Application December 12, 1949, Serial No. 132,581
In Great Britain December 23, 1948

14 Claims. (Cl. 235—61)

Figure 1:
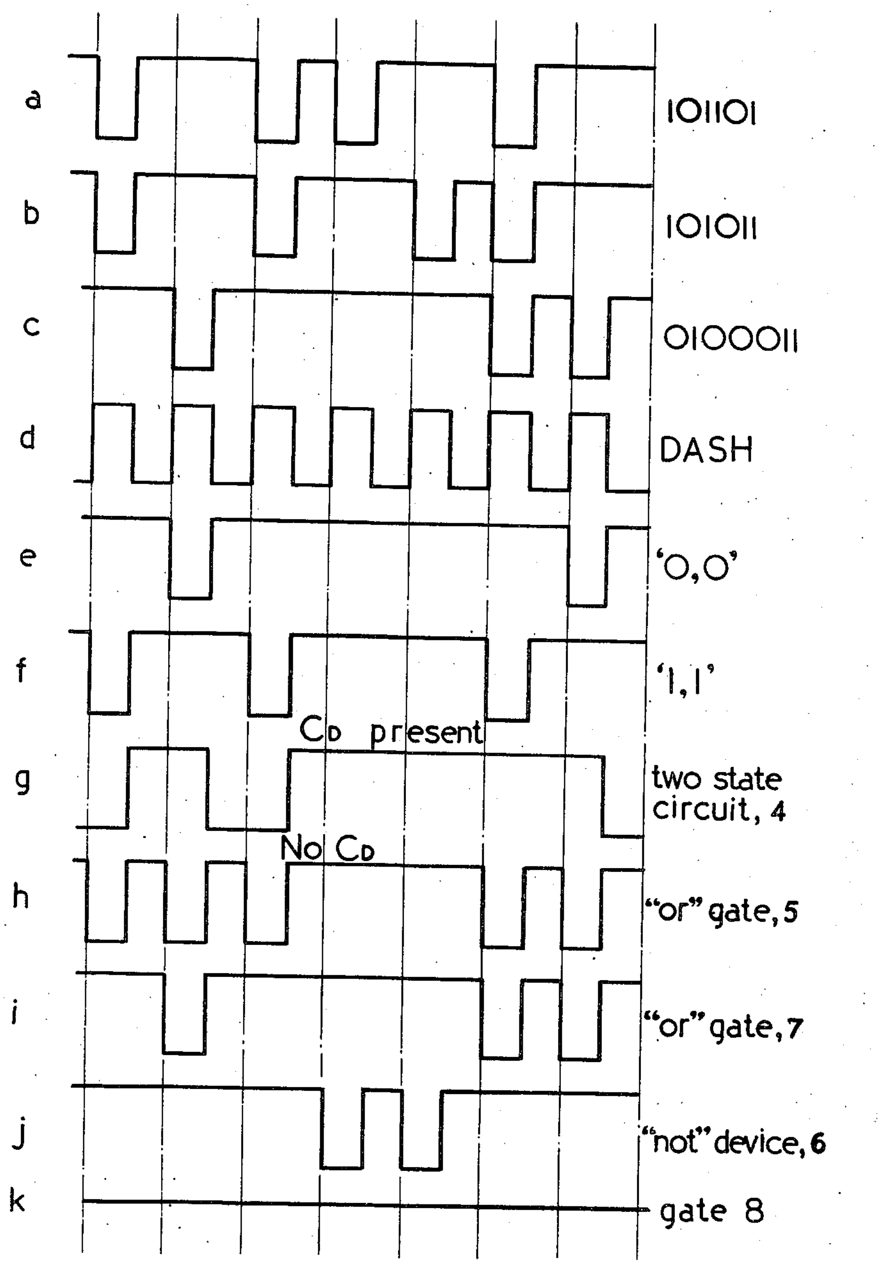

This invention relates to circuit arrangements for performing the process of addition of two numbers existing in binary-digital form in the series mode, i. e. each number being expressed dynamically as a temporal series of electrical pulse signals in its respective channel.

In circuit arrangements for performing the addition of two binary-digital numbers in the series mode, the addition process proceeds step-by-step, each step comprising the computation involved in adding the corresponding digits of like significance in the two numbers and any digit to be carried over from the addition of the preceding digits; the digits of lowest significance occurring first in the temporal series of pulses representing each number.

The rules governing the addition of binary numbers are set out in Table 1 which indicates the answer and carry digit C to be carried to the next step of computation for the eight possible combinations of the coefficients "0" and "1" of the digits A, B to be added and the digit $C_D$ carried from the preceding step of computation.

*Table 1*

| A | B | $C_D$ | "A+B" | C |
|---|---|---|---|---|
| 0 | 0 | 0 | 0 | 0 |
| 1<br>0<br>0 | 0<br>1<br>0 | 0<br>0<br>1 | 1 | 0 |
| 0<br>1<br>1 | 1<br>0<br>1 | 1<br>1<br>0 | 0 | 1 |
| 1 | 1 | 1 | 1 | 1 |

The occurence of a carry digit in the process of addition of the corresponding digits of two binary-digital numbers requires that the coefficient of the carry digit must be retained during the period between the occurrence of adjacent digits in the numbers. In some forms of binary-digital adding circuits, such as that described in patent specification No. 19,967/48, the carry digit is produced in dynamic form, during the process of addition of two digits as a pulse which is then delayed by the interdigit period so that it is available simultaneously with the next digits in the numbers being added.

According to the present invention an electrical adding circuit arranged to receive successive pairs of coincident pulses $A_1$ $B_1$, $A_2$ $B_2$ etc. each pulse having either a first state representing the binary coefficient "0" or a second state representing the binary coefficient "1," comprises separate input lines for receiving the A pulses and the B pulses, comparison means including coincidence circuits connected thereto, control connections between said comparison means and an electronic switch and separate output circuits from said comparison means arranged to be selected by said switch, the arrangement being such that a control pulse produced by said comparison means when the pulses of one pair $A_1B_1$ fed thereto have like states sets the switch into a "carry" or "no-carry" condition in time for the arrival of the next pair $A_2B_2$, the condition depending upon whether pulses $A_1B_1$ have the second or first states respectively, and that one output circuit (selected by the switch when in the "carry" condition) is fed with a pulse having the second state each time a pulse pair of like states arrives at the comparison means, and another output circuit (selected by the switch when in the "no-carry" condition) is fed with a pulse having the second state each time a pulse pair of unlike states arrives at the comparison means.

It is thus a feature of the present invention that the carry digit arising as a result of a step of addition of two or more simultaneously occurring digits is not produced dynamically as an electrical pulse but is represented by the condition of an electronic switch such as a two-state circuit forming part of the circuit arrangement for the addition of the numbers comprising the simultaneously occurring digits. Thus, on the occurrence of any two simultaneously occurring digits which are to be added the condition of the switch is representative of the digit to be carried from the preceding step of addition, and enables the process of addition of the two digits to be performed, taking into account the coefficient of the carry digit.

The digits to be added are represented dynamically by electrical pulses having one or the other of two states and of some finite duration (one state preferably being represented by the absence of a pulse) and inaccuracy of timing of these pulses and also variations in the waveform at their leading edges are responsible for the uncertainty as to the result of the addition process during the initial stages of the digit pulses. However, the result of an addition process, and thus the formation of a pulse representing the result will be determined well before the ends of the pulses being added. The coefficient of the digit which is being carried from the preceding step of addition must remain undisturbed until any uncertainty in the current step of addition is resolved and also, if change during the digit period of the coefficient of the carry digit stored in the electronic switch would result in a simultaneous change in the coefficient of the answer digit pulse, the coefficient of the carry digit must remain unchanged until the end of the answer digit pulse. It is a further feature of the invention therefore, that the electronic switch which stores the coefficient of a carry digit developed during an addition process is set to the appropriate condition by the trailing edge of a pulse produced during the addition process.

In order that the nature of the invention may be more clearly understood, the rules of Table 1 may be recast in the form indicated in Table 2 which shows the coefficient of the result "$A+B$" and the coefficient of the digit C to be carried, for the four possible combinations of the coefficients of two binary digits, A, B, to be added for the two pre-existing conditions of the adding circuit, significant of "no carry digit" and "carry digit present."

*Table 2*

| A | B | No carry digit | | Carry digit present | |
|---|---|---|---|---|---|
| | | "$A+B$" | C | "$A+B$" | C |
| 0 | 0 | 0 | 0 | 1 | 0 |
| 1<br>0 | 0<br>1 | 1 | 0 | 0 | 1 |
| 1 | 1 | 0 | 1 | 1 | 1 |

Consideration of Table 2 will show that at the end of a step of the adding operation the adding circuit must be set, in preparation for the next step of addition, and irrespective of the pre-existing carry condition, into the "no carry digit" condition if the coefficient of both digits A and B is "0" and into the "carry digit present" condition if the coefficient of both digits A and B is "1." If the digits A and B have differing coefficients ($A$="0," $B$="1" or vice versa) it can be seen that the "carry" condition of the adding circuit must be left undisturbed.

A further simplification in the form of Table 3 may be derived from Table 2 in order to indicate the coefficient of the answer ("$A+B$") digit corresponding to the four combinations of the two possible pre-existing carry conditions of the adding circuit and the two conditions of the difference between the coefficients of the digits A and B to be added. The coefficient of the difference between the digits A and B may be "0" or "1," expressed symbolically as $A{\sim}B=0$ and $A{\sim}B=1$, the condition $A{\sim}B=0$ existing when the coefficients of A and B are similar, i. e. both "0" or "1" and the condition $A{\sim}B=1$ existing when the coefficients of A and B are dissimilar.

*Table 3*

| | Answer "$A+B$" | |
|---|---|---|
| | No Carry | Carry |
| $A{\sim}B=0$ | 0 | 1 |
| $A{\sim}B=1$ | 1 | 0 |

Figure 2:
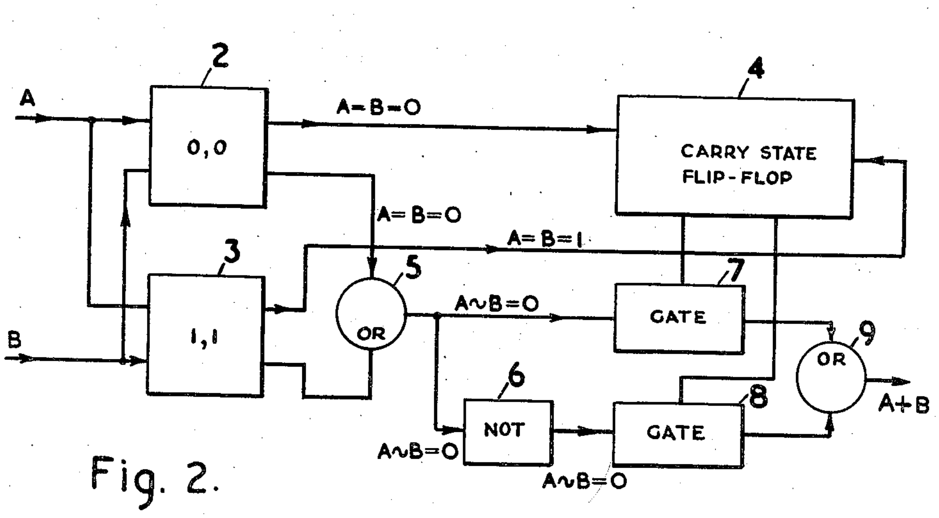

In order that the invention may be more clearly understood and readily carried into effect reference will now be made to the accompanying drawings in which:

Fig. 1 is an explanatory waveform diagram illustrating the operation of the circuit shown in Figure 2, Fig. 2 shows in block schematic form an adding circuit according to this invention; and Figs. 3–9 show circuit diagrams of preferred forms of the component parts of Fig. 2.

In Fig. 1 waveform (*a*) represents the binary number 101101

$$(1.2^0+0.2^1+1.2^2+1.2^3+0.2^4+1.2^5=\text{forty-five})$$

as a train of negative-going pulses in the form it would be applied to the adding circuit shown in Fig. 2. The number is represented by four pulses representing the digits having the binary coefficient "1," the digits having the coefficient "0" being represented by the absence of a pulse. In the following description these pulses will be called "digit pulses" whilst the term "digit signal" will be used to mean either a digit pulse (coefficient "1") or the absence of such pulse (coefficient "0"). Fig. 1(*b*) shows the binary number 101011 (fifty-three) as it would be applied to the adding circuit of Fig. 2 and Fig. 1(*c*) shows the sum of the two numbers i. e. 0100011 (ninety-eight) as it would be obtained from the output of the adding circuit. There is utilised in the adding circuit of Fig. 2 regularly recurring positive pulses, hereinafter referred to as dash pulses, which are shown in Fig. 1(*d*). These dash pulses have the same duration as the digit pulses and one occurs in each digit period simultaneously with a digit pulse (if present).

An adding circuit according to this invention will now be described with reference to Fig. 2. The two trains of pulses representing the two numbers to be added (Figs. 1(*a*) and 1(*b*)) are fed simultaneously to coincidence circuits 2 and 3, the timing being such that corresponding digit signals A and B (representing digits of the same significance in the two numbers) occur together. The circuit 2 is arranged to produce a negative output pulse if both the digit signals A and B represent "0." This negative output pulse is arranged to have the same timing and duration as the dash pulse occurring in the same digit period as the digit signals A and B. The circuit 3 is arranged to give a negative output pulse if both the digit signals A and B are digit pulses representing "1." This negative output pulse also is arranged to have the same timing as the dash pulse occurring in the same digit period as the digit signals A and B, i. e. it is of the same duration, timing and polarity as the digit pulses A and B. The outputs of the circuits 2 and 3 when fed with the two pulse trains shown in Figs. 1(*a*) and 1(*b*) are shown respectively in Figs. 1(*e*) and 1(*f*).

The outputs of the circuits 2 and 3 feed respectively the two inputs of a two-state device 4 (e. g. a double stability multivibrator circuit) which stores the carry digit C. An output pulse from the circuit 2 is arranged to set the two-state device 4 into a "no-carry" condition, while an output pulse from the circuit 3 is arranged to set the two state device 4 into a "carry" condition. The two-state circuit 4 is arranged to be set up by the trailing edge of the pulses applied to it, so that its condition during the applied A and B digit signals is determined by previous A and B signals. The condition of the two-state circuit 4 when the two pulse trains shown in Fig. 1(*e*) and 1(*f*) are applied respectively to its two inputs is represented diagrammatically in Fig. 1(*g*), the lower level representing the "no carry" condition and the upper level representing the "carry" condition.

The circuits 2 and 3 also feed a buffer circuit 5 (marked "OR" in Fig. 2) arranged to give an output negative pulse if it receives a pulse from either of them. This output pulse is arranged to be coincident with the input pulse. Thus an output pulse from the buffer circuit 5 during a digit period is significant of the condition $A \sim B = 0$ while the absence of a pulse from the buffer circuit 5 during a digit period is significant of the condition $A \sim B = 1$. The output of the buffer circuit 5 when it receives pulses from the circuit 2 shown in Fig. 1(*e*) and from the circuit 3 shown in Fig. 1(*f*) is shown in Fig. 1(*h*).

The buffer circuit 5 feeds a gate circuit 7 which is also fed with one output of the two-state circuit 4. The gate circuit 7 is held conducting when the two-state circuit 4 is in the "carry" condition and non-conducting when the two-state circuit 5 is in the "no-carry" condition. The output from the gate circuit 7 when it receives the output from the buffer circuit 5 shown in Fig. 1(*h*) with the two-state circuit 4 in a condition as represented in Fig. 1(*g*) is shown in Fig. 1(*i*). The gate circuit 7 feeds a buffer circuit 9.

The buffer circuit 5 also feeds a negator device 6 (marked "NOT" in Fig. 2) which gives an output negative dash pulse if it does not receive a pulse from the buffer circuit 5 during a digit period; if it does receive a pulse it gives no output pulse. Thus an output pulse from the negator 6 is significant of the condition $A \sim B = 1$. The output from the negator 6 when it receives the output from the buffer circuit 5 shown in Fig. 1 (*h*) is shown in Fig. 1(*j*). The negator 6 feeds a gate circuit 8 which is also fed with a second output of the two-state circuit 4. The gate circuit 8 is held conducting when the two-state circuit is in the "no carry" condition and non-conducting when the two-state circuit 4 is in the "carry" condition. The output of the gate circuit 8 when it receives the pulses from the negator 6 shown in Fig. 1(*j*) with the two-state circuit in a condition as represented in Fig. 1(*g*) is shown in Fig. 1(*k*). The gate circuit 8 feeds the buffer circuit 9.

The buffer circuit 9 gives a negative output pulse if it receives a pulse either from the gate circuit 7 or the gate circuit 8, and its output pulses represent the sum of the two numbers applied to the input of the adding circuit. Thus the buffer circuit 9 receives a pulse from the gate circuit 7 significant of the condition $A \sim B = 0$ when there is a carry digit $C_D$ to be taken into account and it gives an output pulse representing "1" as required by Table 3. It also receives a pulse from the gate circuit 8 significant of the condition $A \sim B = 1$ when there is no carry digit $C_D$ to be taken into account and gives an output pulse representing "1" as required by Table 3.

Figure 3:
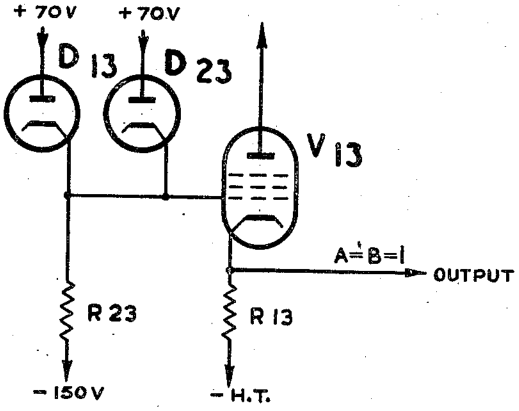

A circuit diagram of a preferred form of coincidence circuit 3 of Fig. 2 will now be described with reference to Fig. 3 of the accompanying drawings. The circuit comprises a pentode valve V13 having a resistance R13 in its cathode circuit whereby it operates as a cathode-follower. The control grid of the valve is connected to the cathode of two diodes D13 and D23 and through a grid leak resistance R23 to a source of −150 volts. The signals representing the two digits A and B are applied respectively to the anodes of the diodes D13 and D23 from a resting level of +70 volts, the negative-going pulses representing "1's" being of 55 volts amplitude. When A and B digit signals representing "1" occur simultaneously, i. e. both are pulses, both of the diodes D13 and D23 are rendered non-conducting and a negative output pulse, of duration equal to that of the digit pulses A and B, is developed across the cathode load resistance R13. This negative output pulse will be representative of the condition $A = B = 1$. No negative pulse is developed across the resistance R13 if either the A or the B digit signal represents "0" since one of the diodes is then conducting and the potential on the grid of the valve V13 is maintained positive.

Figure 4:
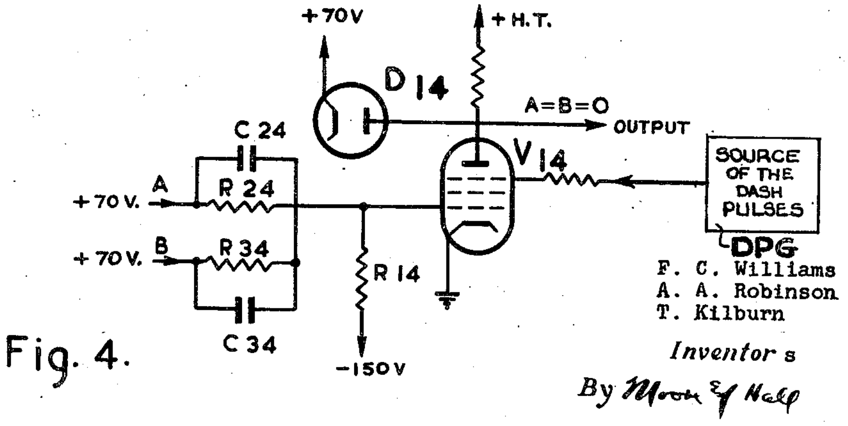

A circuit diagram of a preferred form of coincidence circuit 2 of Fig. 2 will now be described with reference to Fig. 4 of the accompanying drawings. The circuit comprises a pentode valve V14 the control grid of which is connected through a resistance R14 to a source of −150 volts. The signals representing the two digits A and B are applied respectively through resistances R24 and R34 to the control grid of the valve V14, the negative-going pulses representing "1's" being of 55 volts amplitude and from a resting level of +70 volts. The resistances R14, R24 and R34 are so proportioned that the potential on the control grid of the valve V14 is sufficient to maintain the valve current turned on. The anode of the valve V14 is connected to the anode of a diode D14 the cathode of which is connected to a source of +70 volts, so that the potential on the anode of the valve V14 cannot rise above +70 volts. Positive-going dash pulses, Fig. 1(*d*) derived from a source DPG, are applied to the suppressor grid of the valve V14 from a resting level of −60 volts which is sufficient to prevent the valve current reaching the anode. When both the A and B digit signals represent "0," the valve current remains turned on at its control grid and a positive dash pulse on the suppressor grid will produce a negative output pulse at the anode of the valve which comes from a resting level of 70 volts. This negative output pulse is representative of the condition $A = B = 0$. If either or both the A and B digit signals represent "1," i. e. one or both is a negative pulse, the valve current is cut off at the control grid and no negative pulse will be produced at the anode of the valve due to a dash pulse. Condensers C24 and C34 having a small capacity are inserted in parallel respectively with the resistances R24 and R34 in order to improve the high frequency response of the circuit. Thus the time rate of fall of the potential on the control grid of the valve V14 due to the leading edge of a digit pulse will be made quicker.

Figure 5:
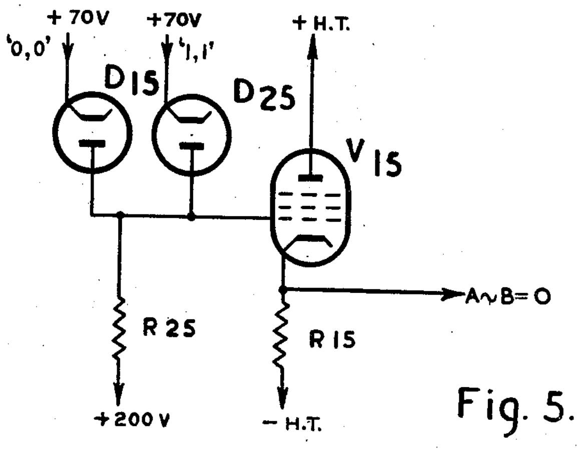

A circuit diagram of a preferred form of buffer circuit 5 of Fig. 2 will now be described with reference to Fig. 5 of the accompanying drawings. The circuit comprises a pentode valve V15 having a resistance R15 in its cathode load whereby it operates as a cathode follower. The control grid of the valve V15 is connected through a grid-leak resistance R25 to a source of +200 volts and also to the anodes of two diodes D15 and D25. Negative pulses from the circuit 2 (Fig. 4) and the circuit 3 (Fig. 3) are applied respectively to the cathodes of the diodes D15 and D25, the pulses being of 55 volts amplitude and coming from a resting level of 70 volts. On the occurrence of a negative pulse the potential on the control grid of the valve V15 falls and a negative output pulse of approximately 55 volts amplitude is developed across the cathode load resistance R15. This negative output pulse will be representative of the condition $A\sim B=0$.

Figure 6:
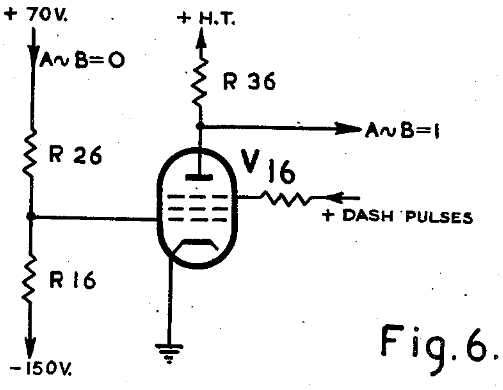

A circuit diagram of a preferred form of negator 6 of Fig. 2 will now be described with reference to Fig. 6 of the accompanying drawings. The circuit comprises a pentode valve V16 which has its control grid connected to a tapping on a potential divider R16, R26, one end of which is connected to a potential of −150 volts and the other end of which is connected to the buffer circuit 5 (Fig. 5). Negative pulses from the buffer circuit 5 (Fig. 5) representative of the condition $A\sim B=0$ are applied to the control grid of the valve V16 via the resistance R26 and from a resting level of +70 volts. The resistances R16 and R26 are so proportioned that the valve current is normally turned on at its control grid. Positive-going dash pulses, Fig. 1(*d*), are fed to the suppressor grid of the valve V16 from a resting level of −60 volts and these will, in the absence of a negative pulse applied to the control grid from the buffer circuit 5 (Fig. 5), produce negative pulses across the anode load resistance R36 of the valve V16. These pulses will be representative of the conditions $A\sim B=1$. However if there is a negative pulse representative of $A\sim B=0$ applied to the control grid of V16, the valve current is cut off at the control grid for the duration of this pulse and the simultaneously occurring dash pulse applied to the suppressor grid will produce no effect at the anode of V16.

Figure 7:
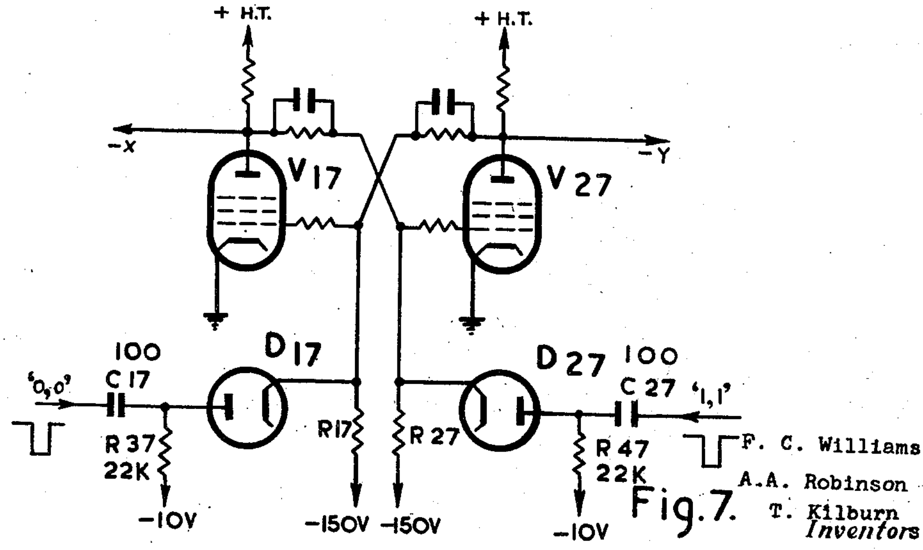

A circuit diagram of a preferred form of two-state device 4 of Fig. 2 will now be described with reference to Fig. 7 of the accompanying drawings. The circuit comprises two pentode valves V17 and V27 which have their anodes and control grids cross-connected to form a conventional two-state trigger circuit, the valve V17 being conducting when the valve V27 is non-conducting and vice-versa. The valves V17 and V27 have grid leak resistances R17 and R27 respectively each of which is connected to a potential of −150 volts. Negative pulses from the coincidence circuit 2 (Fig. 4) are applied to a differentiating circuit C17, R37 which is connected to the anode of a diode D17 which is also connected through a resistance R37 to a potential of −10 volts. The cathode of the diode D17 is connected to the control grid of the valve V17 and thus to the anode of the valve V27. The diode D17 is thus held non-conducting when the anode potential of the valve V27 is high (i. e. valve V27 is non-conducting) and is held conducting when the anode potential of the valve V27 is low (i. e. valve V27 is conducting). A negative pulse from the circuit 2 is differentiated by the differentiating circuit C17, R37 which produces a sharp negative pulse coincidently with the leading edge of the pulse and a sharp positive pulse coincidently with the trailing edge of the pulse. When the diode D17 is conducting (i. e. valve V17 is non-conducting) these sharp pulses will be applied to the control grid of the valve V17. The sharp negative pulse will not affect the conductivity of the valve V17, but the sharp positive pulse will render the valve V17 conducting and thus the valve V27 non-conducting. Negative-going pulses from the coincidence circuit 3 (Fig. 3) are similarly fed to a differentiating circuit C27, R27 which is connected to the valve V27 via a diode D27. Thus a negative pulse from the circuit 3 will render the valve V27 conducting and the valve V17 non-conducting. It can thus be seen that when the trigger circuit has been triggered by a pulse from the circuit 2, i. e. has been triggered into the "no carry" condition, the potential at the point $x$ at the anode of the valve V17 will be low while the potential at the point $y$ at the anode of the valve V27 will be high. When the trigger circuit has been triggered by a pulse from the circuit 3, i. e. has been triggered into the "carry" condition the potentials at the points $x$ and $y$ will be reversed.

Figure 8:
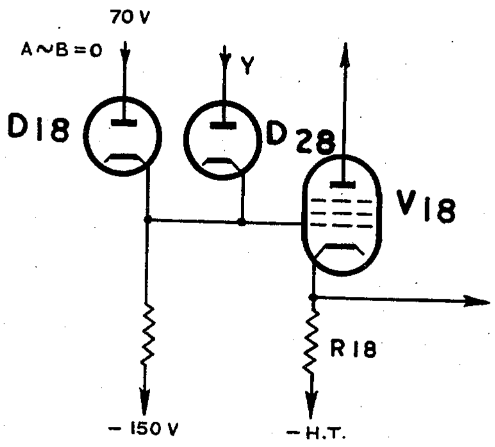

A circuit diagram of a preferred form of gate circuit 7 of Fig. 2 will now be described with reference to Fig. 8 of the accompanying drawings. The circuit comprises a pentode valve V18 and two diodes D18 and D28 connected in the same manner as the valve V13 and diode D13 and D23 of Fig. 3. The anode of the diode D18 has negative pulses representing the condition $A\sim B=0$ applied to it from the buffer circuit 5 (Fig. 5) while the anode of the diode D28 is connected to the anode circuit of the valve V27 in the trigger circuit (Fig. 7). Thus the diode D28 is rendered non-conducting when the trigger circuit is in the "carry" condition and any negative pulse applied to the diode D18 from the buffer circuit (Fig. 5) in this condition will be developed across the cathode load resistance R18. If the trigger circuit is in the "no carry" condition the diode D28 is conducting and a negative pulse applied to the diode D18 from the buffer circuit (Fig. 5) will not be developed across the cathode load resistance R18.

Figure 9:
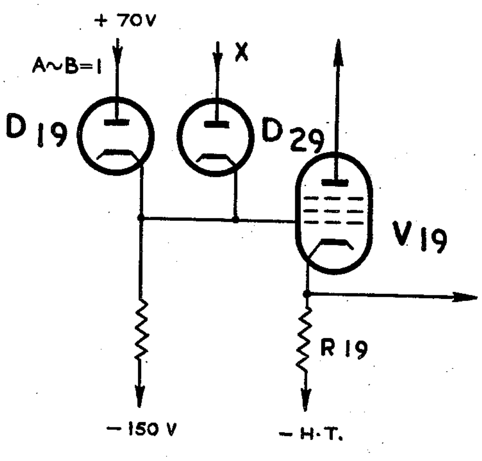

The circuit diagram of a preferred form of gate circuit 8 of Fig. 2 will now be described with reference to Fig. 9 of the accompanying drawings. The circuit comprises a pentode valve V19 and two diodes D19 and D29 similarly connected to the valve V18 and diodes D18 and D28 of Fig. 8. Negative pulses from the negator device 6 (Fig. 6) representative of the condition $A\sim B=1$ are applied to the anode of the diode D19 while the anode of the diode D29 is connected to the anode circuit of the valve V17 in the trigger circuit of Fig. 7. Thus the diode D29 is renderd non-conducting when the trigger circuit is in the "no carry" condition and any pulse applied to the anode of the diode D19 when the diode D29 is non-conducting will be developed across the cathode load resistance.

The buffer circuit 9 of Fig. 2 is preferably similar to the buffer circuit described with reference to Fig. 5 of the accompanying drawings.

It will be understood that the adding circuit above described will be a part of a binary digital computing machine, and the synchronising parts of the machine will ensure that pulses representing digits of equal significance in the two pulse trains fed to the adding circuit will occur simultaneously.

We claim:

1. An electrical circuit for adding two binary numbers and arranged to receive successive pairs of coincident digit-representing signals, each signal having either a first state representing the binary coefficient "0" or a second state representing the binary coefficient "1," said circuit comprising input lines for receiving signals of said pairs of signals, first and second comparison means each including coincidence circuits connected to said input lines, switch means, control connections between said comparison means and said switch means and separate output circuits from said comparison means arranged to be selected by said switch, said first comparison means including means responsive to the states of said input signals and including further means producing an output potential when said input signals are both of the "0" representing state, said second comparison means including means responsive to the states of said input signals and including further means producing an output potential when said input signals are both of the "1" representing state, said switch means including means responsive to the output potentials of said first and second comparison means and being so arranged and constructed that it assumes a "carry" mode when an output potential is produced by said further means of said second comparison means and assumes a "no-carry" mode when an output potential is produced by said further means of said first comparison means, signal producing means coupled to said output circuits and producing signals of said first and second states, and means coupling said switch means to said output circuits, said output circuits including means responsive to the modes of said switch means and permitting a signal of said first state from said signal producing means to pass when said switch means is in said "carry" mode and no output potential is produced by either of said first and second comparison means or when said switch means is in said "no-carry" mode and an output potential is produced by either of said first and second comparison means and permitting a signal of said second state from said signal producing means to pass when said switch means in it its "no-carry" mode and no output potential is produced by either of said first and second comparison means or when said switch means is in its "carry" mode and an output potential is produced by either of said first and second comparison means.

2. An electrical adding circuit according to claim 1 wherein said first and second comparison means are arranged to provide output signals of said second state and wherein said signal producing means comprises a buffer circuit connected to the output of both of said comparison means, separate output circuits from said buffer circuit and a negator device in one of said output circuits so arranged and constructed that it produces an output signal of said second state in the absence of an output from said buffer circuit and vice-versa.

3. An electrical adding circuit according to claim 1 wherein said switch means comprises a two-state trigger circuit connected to each of said coincidence circuits and adapted to supply switching pulses on changing its condition from one mode to the other, and two gate circuits responsive to such switching pulses, one connected in each of said output circuits.

4. An electrical adding circuit according to claim 1 wherein each connection between a coincidence circuit and the trigger circuit includes a differentiating network which serves to enable the trailing edge of a control pulse to be utilized to change the trigger circuit from one state to the other.

5. A circuit arrangement for producing, from two input pulse trains (A) and (B) each representing by its succession of pulses the digits of a binary number and fed thereto on separate input lines simultaneously digit by digit, a final output pulse train $(A+B)$ representing by its succession of pulses the digits of the binary sum of the two numbers, said circuit arrangement comprising a first coincidence circuit supplied with each input pulse train for producing at its output a voltage pulse whenever the signal representing the digit "1" occurs simultaneously in each of the input pulse trains (A) and (B), a second coincidence circuit also supplied with each input pulse train for producing at its output a voltage pulse whenever the signal representing the digit "0" occurs simultaneously in each of the input pulse trains (A) and (B), a first gate circuit, a circuit means connecting the outputs of said first and second coincidence circuits to the input of said first gate circuit, an output line, circuit means connecting the output of said first gate to said output line, a negator device producing an output signal representing the digit "1" in the absence of an input pulse thereto, circuit means connecting the outputs of said first and second coincidence circuits to the input of said negator device, a second gate circuit, circuit means connecting the output of said negator device to the input of said second gate, circuit means connecting the output of said second gate to said output line, electronic two-state switching means connected to said coincidence circuits so arranged and constructed as to be set by the output signals from said first or second coincidence circuits into a "carry" or a "no-carry" state respectively in time for the arrival of the next pair of digit signals in the input trains (A) and (B), circuit connections between the output of said electronic switching means and said first gate circuit whereby said first gate circuit is placed in a condition to pass signals from its input to its output when said electronic switching means is in its "carry" state, and circuit connections between the output of said electronic switching means and said second gate circuit whereby said second gate circuit is placed in a condition to pass signals from its input to its output when said electronic switching means is in its "no-carry" state.

6. A circuit arrangement for producing, from two input pulse trains (A) and (B), each representing by its succession of pulses the digits of a binary number and fed thereto on separate input lines simultaneously digit by digit, a final output pulse train $(A+B)$ representing by its succession of pulses the digits of the binary sum of the two numbers, said circuit arrangement comprising a first coincidence circuit supplied with each of said input pulse trains and producing at its output a separate signal representing the digit "1" whenever input signals "1" occurs simultaneously in each of the input pulse trains (A) and (B), a second coincidence circuit also supplied with each input pulse train for producing at its output a separate signal representing the digit "1" whenever the input signals "0" occur simultaneously in each of the input pulse trains (A) and (B), a first double input buffer circuit having its input connected respectively to the outputs of both first and second coincidence circuits, a first gate circuit, circuit means connecting the output of said first buffer circuit to the input of said first gate circuit, a second double input buffer circuit, circuit means connecting the output of said first gate circuit to one input of said second buffer circuit, an output line, circuit means connecting the output of said second buffer circuit to said output line, a negator device producing a separate output signal representing the digit "1" in the absence of any input thereto, circuit means connecting the output of said first buffer circuit as a controlling input to said negator device, a second gate circuit, circuit means connecting the output of said negator device to the input of said second gate circuit, circuit means connecting the output of said second gate circuit to the second input of said second buffer circuit, two-state electronic switching means connected to said first and said second coincidence circuits so arranged and constructed as to be set by the output signals of said coincidence circuits into a "carry" or "no-carry" state respectively in time for the arrival of the next pair of digit signals in the input trains (A) and (B), said switching means producing alternative output switching voltages on changing condition from one state to the other, circuit connections between one output of said switching means and said first gate circuit whereby said first gate circuit is placed in a condition to pass signals from its input to its output when said switching means is in its "carry" state, and circuit connections between the other output of said switching means and said second gate circuit whereby said second gate circuit is placed in a condition to pass signals from its input to its output when said switching means is in its "no-carry" state.

7. A circuit arrangement for producing, from two input pulse trains (A) and (B) each representing by its succession of pulses the "1" digits of a binary number and fed thereto on separate input lines simultaneously digit by digit, a final output pulse train $(A+B)$ representing by its succession of pulses the "1" digits of the binary sum of the two numbers, said circuit arrangement comprising a first coincidence circuit supplied with each input pulse train for producing at its output a self-generated pulse representing the digit "1" whenever pulses representing the digit "1" occur simultaneously in the input pulse trains (A) and (B), a second coincidence circuit also supplied with each input pulse train for producing at its output a self-generated pulse representing the digit "1" whenever pulses representing the digit "1" are absent simultaneously from both of the input pulse trains (A) and (B), a first buffer circuit having input terminals connected to the outputs of said first and second coincidence circuits, a first gate circuit, circuit means connecting the output of said buffer circuit to the input of said first gate circuit, a second buffer circuit, circuit means connecting the output of said first gate circuit to the input of said second buffer circuit, an output line, circuit means connecting the output of said second buffer circuit to said output line, a negator device producing a self-generated output pulse representing the digit "1" in the absence of an input pulse thereto, circuit means connecting the output of said first buffer circuit to the input of said negator device, a second gate circuit, circuit means connecting the output of said negator device to the input of said second gate circuit, circuit means connecting the output of said second gate to the input of said second buffer circuit, an electronic two-state trigger circuit having separate input terminals connected respectively to the outputs of said first and second coincidence circuits so arranged and constructed as to be triggered by the output pulses from said first or said second coincidence circuits into a "carry" or a "no-carry" state respectively in time for the arrival of the next pair of digit signals in the input trains (A) and (B), said trigger circuit being adapted to produce at separate output terminals switching voltages representing its "carry" and "no-carry" state respectively, circuit connections between the "carry" pulse output terminals of said trigger circuit and the control terminals of said first gate circuit for placing said first gate circuit in a condition to pass signals from its input to its output when said trigger circuit is changed from its "no-carry" to its "carry" state, and circuit connections between the "no-carry" pulse output terminals of said trigger circuit and the control terminals of said second gate circuit for placing said second gate circuit in a condition to pass signals from its input to its output when said trigger circuit is changed from its "carry" to its "no-carry" state.

8. A circuit arrangement according to claim 7 in which each circuit connection between a coincidence circuit and said two-state trigger circuit includes a differentiating network for enabling the trailing edges of the output pulses from said coincidence circuits to be utilized to effect triggering of said trigger circuit from one state to the other.

9. A circuit arrangement according to claim 7 in which said negator device comprises a thermionic tube having a cathode, an anode and at least three grid electrodes between said cathode and said anode, the output of said first buffer circuit being connected to that grid electrode nearest the cathode, and a source of regularly recurring positive pulses, having the same duration as digit representing pulses and timed to occur one in each digit period simultaneously with the digit pulse periods of said trains (A) and (B), connected to that grid nearest the anode, the amplitude and polarity of the output pulses from said buffer circuit being such as to cut off the cathode current of said tube.

10. A circuit arrangement for producing an output train of pulses representative of the sum of two input trains of pulses each of which is representative of a number in the binary digital code and consists of a plurality of sequential digit-representing intervals wherein the binary digit value "1" is represented by the presence of a pulse of predetermined polarity and the binary digit value "0" is represented by the absence of such a pulse, said arrangement comprising separate input circuits respectively receiving the signal content of corresponding digit intervals of said input trains, a comparison circuit coupled to said input circuits including pulse providing means operating when the signal contents of corresponding digit intervals are representative of the same binary digit value to produce a first output pulse together with either a first control pulse in response to like input signal contents of one binary digit value or a second control pulse in response to like input signal contents of the other binary digit value, switching means coupled to said comparison means including means responsive to said first and second control pulses and assuming a first switching mode in response to the termination of said first control pulses and assuming a second switching mode in response to the termination of said second control pulses, a first output circuit coupled to said comparison circuit and to said switching means, a second output circuit coupled to said comparison circuit and to said switching means including pulsing means generating a second output pulse when said corresponding input signal contents are of different states, said first and second output circuits including means responsive to the modes of said switching means to permit said first output pulse to pass through said first output circuit only when said switching means is of said first mode and to permit said second output pulse to pass through said second output circuit only when said switching means is of said second mode.

11. A circuit arrangement for producing an output train of pulses representative of the sum of two input trains of pulses, each of said trains consisting of a predetermined number of sequential time intervals representing respectively the digit values of a binary number in ascending order of significance, the binary digit value "1" being represented by the presence of a pulse of predetermined polarity during a digit-interval and the binary value "0" being represented by the absence of such a pulse during a digit-interval, said arrangement comprising an input circuit simultaneously receiving the signal content of corresponding digit intervals of said input trains, pulse providing means coupled to said input circuit and responsive to the signal content states of corresponding digit intervals therein and producing a first output pulse when said corresponding signal content states are the same, switching means, having two possible modes, coupled to said input circuit, said switching means including means responsive to the signal content states of corresponding digit intervals in said input circuit and assuming one of said modes when both of said signal content states are representative of one of the two binary digit values and assuming the other of said modes when both of said signal content states are representative of the other of the two binary digit values, pulsing means coupled to said input circuit including means responsive to the signal content states of corresponding digit intervals in said input circuit and producing a second output pulse when said corresponding signal content states in said input differ, a first output circuit coupled to said pulse providing means, a second output circuit coupled to said pulsing means, and gating means in each of said output circuits coupled to said switching means, said gating means including means responsive to the modes of said switching means for selectively opening one of said gating means in response to one of said modes and opening the other of said gating means in response to the other of said modes.

12. A circuit as claimed in claim 11 in which said switching means is a bi-stable multivibrator.

13. A circuit as claimed in claim 12 in which said multivibrator produces control potentials in each of its modes of operation, said gating means each including a thermionic valve having a grid and an anode, said control potentials being coupled respectively to said grids and said output pulses being coupled respectively to said anodes.

14. An electrical binary adding circuit for providing an output pulse signal train representing the sum of two numbers each represented by an input pulse signal train, said signal trains each being characterised by the presence of either a "0" representing signal or a "1" representing signal in each of a plurality of sequential time intervals representative respectively of the component digits of the binary numbers concerned in ascending order of binary power and significance and the digit time intervals of each of the number representing signal trains being coincident and representative of the same binary power, said circuit comprising signal comparing means supplied with each of said input pulse signal trains and providing an output potential whenever the coincident signals of said input trains are representative of the same binary digit value; together with a first control pulse while said coincident signals are each representative of the binary value "0" or a second control pulse while said coincident signals are each representative of the binary value "1," switching means operated by said first and second control pulses to assume a first switching mode upon termination of any first control pulse and to assume a second switching mode upon termination of any second control pulse, controlled signal providing means for providing output signals representative of either of said binary "0" and binary "1" digit values, an output circuit and control connections between said signal producing means, said switching means and said signal comparing means to cause supply to said output circuit of a "0" representing signal whenever said output potential occurs in time coincidence with said first mode of said switching means or when said second mode of said switching means occurs in the absence of said output potential and to cause the supply of a "1" representing signal to said output circuit whenever said output potential occurs in time coincidence with said second mode of said switching means or when said first switching mode occurs in the absence of said output potential.

FREDERIC C. WILLIAMS.
ARTHUR A. ROBINSON.
TOM KILBURN.

References Cited in the file of this patent

UNITED STATES PATENTS

| Number | Name | Date |
|---|---|---|
| 2,404,250 | Rajchman | July 16, 1946 |
| 2,425,131 | Snyder | Aug. 5, 1947 |
| 2,429,227 | Herbst | Oct. 21, 1947 |
| 2,429,228 | Herbst | Oct. 21, 1947 |
| 2,445,215 | Flory | July 13, 1948 |